July 21, 1936. B. H. DICKS 2,048,434
MEANS FOR AUTOMATICALLY STOPPING A MOTOR VEHICLE
WHEN A DANGEROUS PLACE OCCURS IN A ROAD
Filed Aug. 12, 1935 4 Sheets-Sheet 1
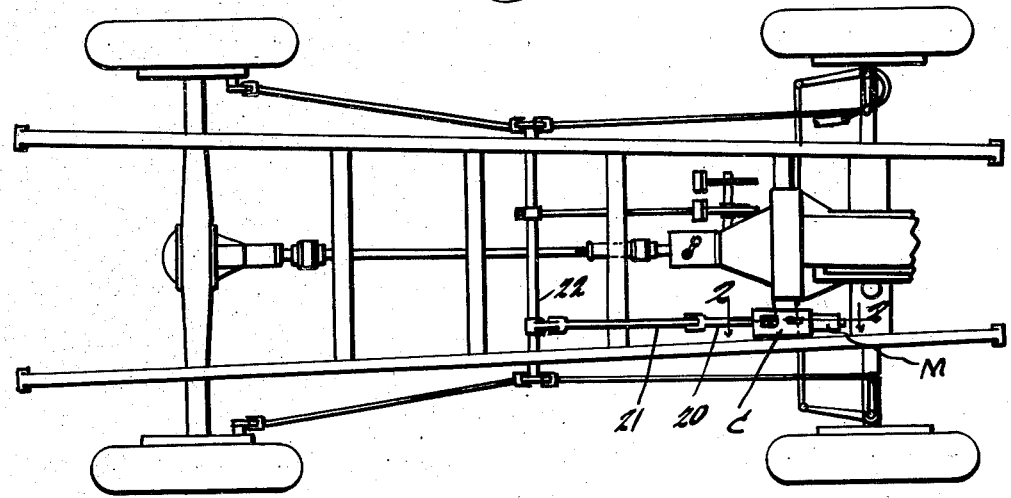
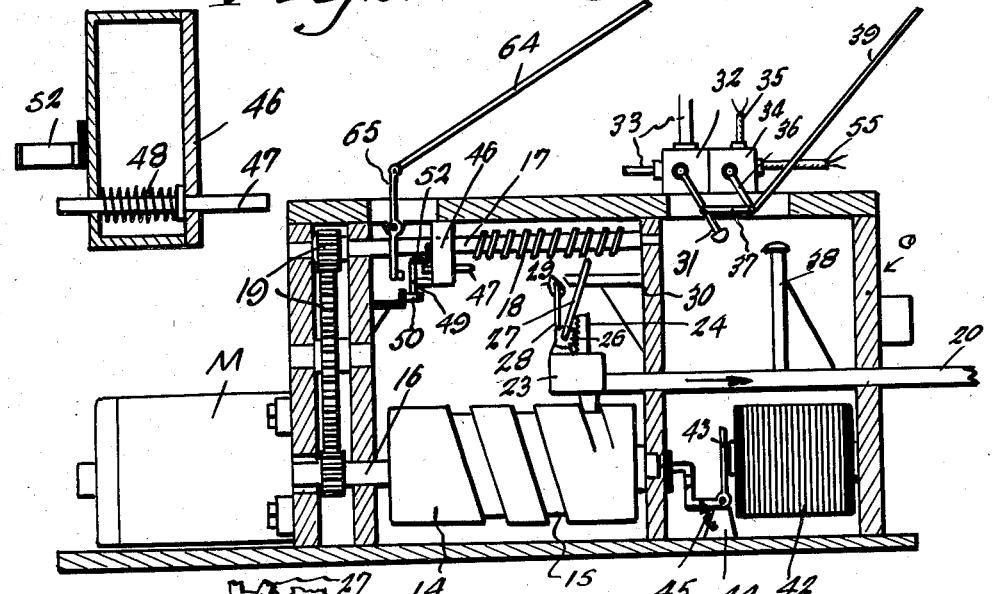
Inventor
Beauford Harold Dicks
By Clarence A. O'Brien
Attorney July 21, 1936.  B. H. DICKS  2,048,434
MEANS FOR AUTOMATICALLY STOPPING A MOTOR VEHICLE
WHEN A DANGEROUS PLACE OCCURS IN A ROAD
Filed Aug. 12, 1935   4 Sheets-Sheet 2

Inventor
Beauford Harold Dicks

By Clarence A. O'Brien
Attorney

July 21, 1936.　　　　B. H. DICKS　　　　2,048,434
MEANS FOR AUTOMATICALLY STOPPING A MOTOR VEHICLE
WHEN A DANGEROUS PLACE OCCURS IN A ROAD
Filed Aug. 12, 1935　　　4 Sheets-Sheet 3

Inventor

Beauford Harold Dicks

By Clarence A. O'Brien
Attorney

July 21, 1936. B. H. DICKS 2,048,434
MEANS FOR AUTOMATICALLY STOPPING A MOTOR VEHICLE
WHEN A DANGEROUS PLACE OCCURS IN A ROAD
Filed Aug. 12, 1935 4 Sheets-Sheet 4
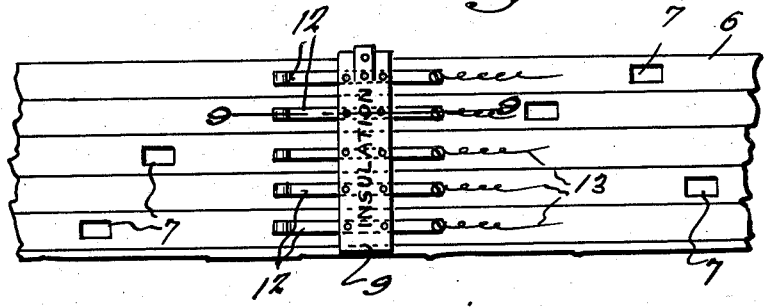
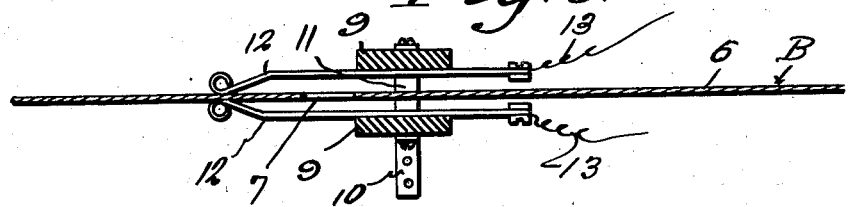
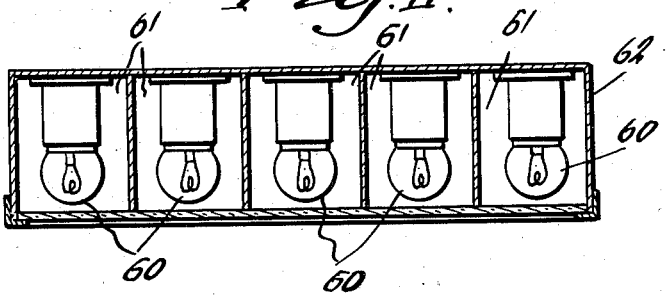
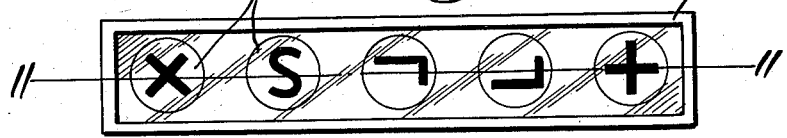
Inventor
*Beauford Harold Dicks*
By *Clarence A. O'Brien*
Attorney Patented July 21, 1936

2,048,434

UNITED STATES PATENT OFFICE 2,048,434

MEANS FOR AUTOMATICALLY STOPPING A MOTOR VEHICLE WHEN A DANGEROUS PLACE OCCURS IN A ROAD

Beauford Harold Dicks, Waupun, Wis.

Application August 12, 1935, Serial No. 35,897

3 Claims. (Cl. 180—82)

This invention relates to route strip controlled means for automatically stopping a motor vehicle when a dangerous place occurs in the road ahead of the vehicle, the general object of the invention being to provide means controlled by a route strip for automatically applying the brakes, opening the ignition circuit and closing the gasoline line as the strip indicates that a bad curve, a railroad crossing, an intersection or the like is being approached.

The present invention is an improvement over that forming the subject matter of my Patent No. 1,998,535 dated April 23, 1935.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a plan view of the chassis of a motor vehicle showing the invention applied thereto.

Figure 3 is a view of the switch and plunger box in section.

Figure 4 is a sectional view through the dog assembly.

Figure 5:
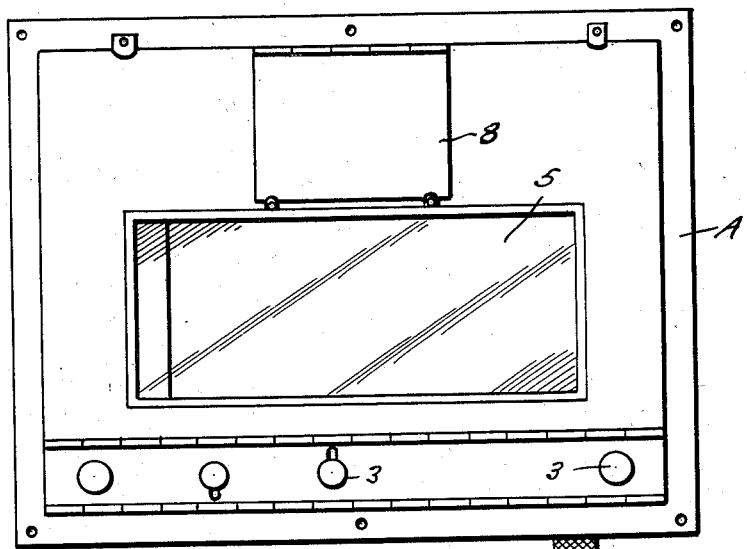

Figure 5 is a front view of the casing containing the route strip and parts of the present invention and which is adapted to be located on the instrument board.

Figure 6:
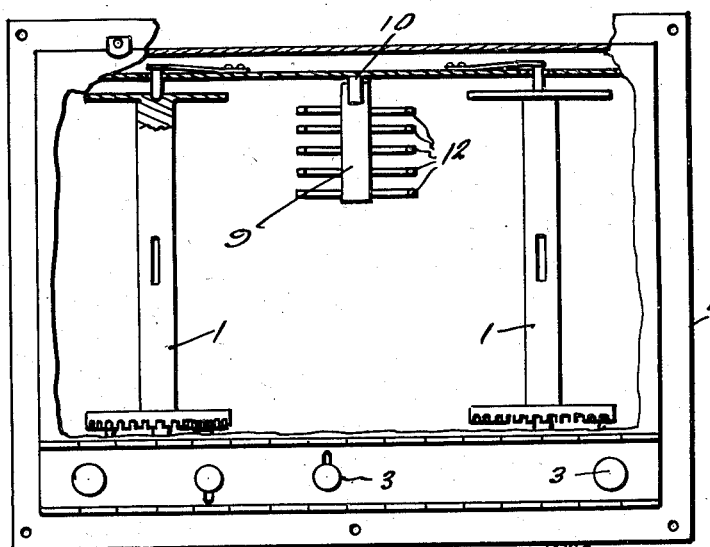

Figure 6 is a view similar to Figure 5 with the parts broken away.

Figure 7 is a view of the manual control means on the instrument board.

Figure 8 is a view of the perforated part of the route strip with the contacting members.

Figure 9 is a section on the line 9—9 of Figure 8.

Figure 10 is a view of the signal casing.

Figure 11 is a section on the line 11—11 of Figure 10.

Figure 12:
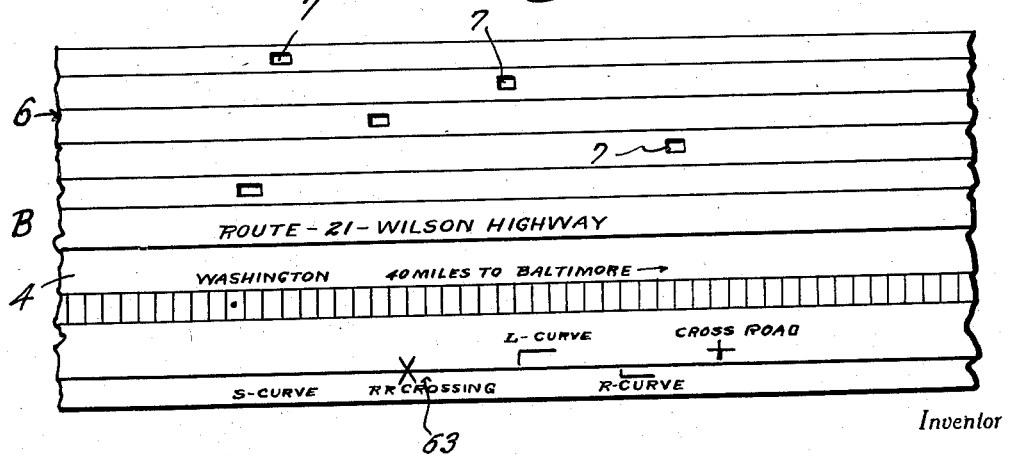

Figure 12 is a fragmentary view of the combined route and contact strip.

Figure 13:
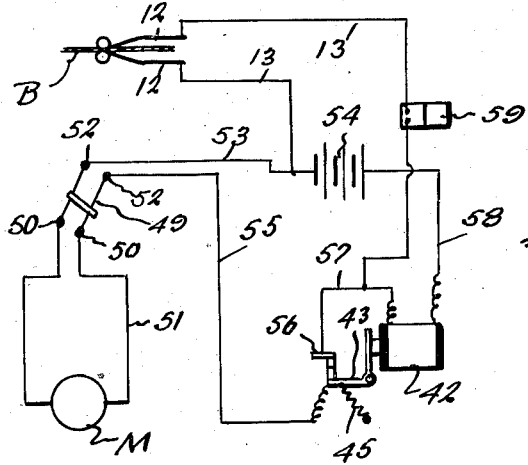

Figure 13 is a diagrammatic view of the circuits.

In these views the letter A indicates a casing which may be carried by the instrument board of an automobile and in which is located the spools 1 for carrying the combined route strip and contact strip shown at B in Figure 12. These spools are operated in any suitable manner from the speedometer of the vehicle, a portion of the connection being shown at 2 in Figures 5 and 6 and these means are controlled through the knobs 3 and as such means form the subject matter of the above mentioned patent it is not thought necessary to describe them in this application.

The strip B includes the route strip part 4 for appearing at the window 5 in the casing A and the strip part 6 which has the perforations or holes 7 therein, this part 6 passing across an opening in the front of the casing A which is normally closed by a door 8.

A pair of insulation strips 9 are supported in spaced relation in the casing, from a top part thereof by a bracket 10 which is connected with the supporting member 11 which is connected with the strips 9. The part 6 of the combination strip B passes between the strips or blocks 9 and each block 9 carries a vertical row of spaced contact strips 12 which have the conductors 13 connected to one end thereof, the other ends of the pairs of strips converging so that these converging ends will come into contact with each other when a hole 7 in the strip B comes opposite them. I prefer to make the door 8 with an offset portion so that the parts can extend into the same to permit the strip B to pass close to the inner face of the front of the casing so that the indication on the part 4 of the strip can be readily observed through the window 5.

Figure 2:
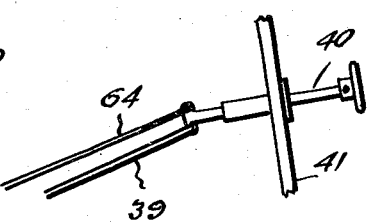
Figure 2 is a section on the line 2—2 of Figure 1.

A casing C is suitably supported by the chassis of the automobile as shown in Figure 1 and said casing contains a rotatably supported drum 14 which is provided with a spiral groove 15. A motor M has its shaft 16 connected with the shaft of the drum so that the drum will be rotated by the motor and a shaft 17 is journaled in the casing C and has a spiral rib 18 thereon and said shaft 17 is driven from the motor shaft by means of the gearing 19. A rod 20 is slidably supported in the casing and has its rear end connected by a link 21 to the brake shaft 22 of the vehicle, as shown in Figure 1, and the front end of the rod within the casing carries a hollow head 23 through which passes a dog 24 normally pressed downwardly by a spring 25 within the head. The lower end of this dog, when the dog is in lowered position engages the groove 15 so that when the drum is rotated the rod 20 will be moved rearwardly to apply the brakes, Figure 2 showing the parts in the position where the dog is in its rearward position. The upper part of the dog 24 is formed with rack teeth engaged by the segmental gear 26 pivotally supported on a part of the head 23 and a long arm 27 and a short arm 28 are connected with the segmental gear, the short arm having a head 29 at its upper end which will engage a stop member 30 when the brake rod nears the end of the rearward movement. When this happens the short arm will be thrown to the left in Figure 2 which will partly rotate the segmental gear so as to lift the dog out of engagement with the groove 15 and to throw the arm 27 into engagement with the spiral rib of the shaft 17 so that this shaft 17 will cause the dog, the brake rod 20 and the parts associated therewith to move forwardly to their original position and thus the brakes will be released.

As the rod 20 moves rearwardly to brake applying position a part 38 will strike a head on an arm 31 which is connected to a valve in a housing 32, said valve controlling the flow of gasoline to the motor of the engine, some of the connecting pipes being shown at 33. This movement of the arm 31 will also open the ignition switch located in the housing 34, the wires being shown at 35. The arm of the switch is shown at 36 and the two arms 31 and 36 are connected together by a link 37. The part 38 is in the form of an upright which will strike the lower end of the arm 31 as this rod 20 moves to the rear and thus the gasoline to the motor will be cut off and the ignition circuit broken as the brakes are being applied so that the vehicle will come to a stop.

A link 39 connects the arm 36 to an operating member 40 on the instrument board 41 of the vehicle as shown in Figure 7 so that when it is desired to start the vehicle again this member 40 is pushed inwardly to cause the link 39 to swing the arms 31 and 36 in a normal operative position so that gas can again flow to the engine and the ignition circuit will be closed.

A magnet 42 is located in a part of the casing C and is provided with a bell crank armature 43 pivoted to a bracket 44 in the casing, the armature being normally held away from the core of the magnet by a spring 45.

A box 46 is supported in the upper part of the casing C and carries a spring-pressed plunger 47 which will be forced against the action of the spring 48 by the arm 27 when the parts are returned to their normal position by the shaft 17 and when this happens the plunger will open a double switch 49 which is pivoted to a part of the box 46 so as to move the switch to open position. When this switch is in closed position it connects the contacts 50 of the circuit 51 of the motor M with the contacts 52 one of which is connected by a conductor 53 with the battery 54 and the other of which is connected by a conductor 55 with the bell crank armature 43. This armature when attracted by the magnet 42 will engage a contact 56 which is connected with the magnet by a conductor 57 and the other terminal of the magnet is connected by a conductor 58 with the battery 54.

The conductors 13 leading from the strips 12 of each pair of strips, are connected one with the conductor 53 and the other with the conductor 57 as shown in Figure 13 and one of said conductors 13 is electrically connected with a buzzer or the like shown at 59 in Figure 13 and these conductors 13 are also electrically connected with the lamp bulbs 60 arranged in chambers 61 in a casing 62 arranged on the instrument board or any other suitable place of a motor vehicle. In front of each chamber is a sign 63 which will be illuminated when the lamp associated therewith is lighted. These signs indicating the state of the road ahead of the motor vehicle.

A link 64 is connected to the member 40 as shown in Figure 7 and said link, as shown in Figure 2, is connected to a lever 65 for closing the switch 49 when it is desired to close the switch by hand.

It will, of course, be understood that the perforations in the part 6 of the route strip B are so located with respect to hazardous parts of the road ahead as to come under the contact strips 12 before the dangerous part of the road is reached. For instance, suppose the vehicle having the invention thereon is approaching a railroad track and at a certain time before the track is reached an opening 7 will come between the bent ends of a pair of these strips 12 and when this happens the bent ends of the two strips will touch each other and thus the circuit to the buzzer 59 will be closed and the circuit to that lamp in rear of the railroad crossing sign 13 will be closed so that the buzzer will sound and a sign will be illuminated and at the same time the circuit to the magnet 42 will be closed and the energizing of this magnet 42 will attract the armature 43 which is normally held away from the magnet by the spring 45, and this will close the circuit to the motor M. The motor will then begin to operate and thus the dog which is in engagement with the front end of the groove 15 in the drum 14 will start to move the rod 20 rearwardly to apply the brakes, it being understood that as the arm 27 strikes the plunger 47 and moves the same the arm will be thrown to the position shown in Figure 2 so that the dog will be in lowered position and the arm will be out of engagement with the bar 18 of the shaft 17.

As the rod 20 moves rearwardly the member 38 will strike the rod 31 and thus close the gasoline line to the motor of the engine and break the ignition circuit so that the motor will stop. Then when the dog is at the end of its rearward stroke the arm 28 will strike the projection 30 so that the dog will be lifted out of the groove 15 and the arm 27 thrown into engagement with the spiral 18 and thus the parts will be returned to their normal position and at the end of this return movement the plunger 47 will be operated to open the switch 49 which will break the circuit in the motor M. Then the operator pushes the plunger member 40 to open the gasoline line and close the ignition circuit and this movement of the member 40 will cause the link 64 and lever 65 to close the switch 49 but as the imperforate part of the strip B passes in between the strips 12 no current will flow to the motor. When the circuit is broken the circuit to the magnet 42 will also be broken so that the spring 45 will move the member 43 to inoperative position and thus breaking the circuit at 56 so that when the switch 49 is closed no current will flow through the motor M until another hole in the strip B comes opposite a pair of the strips 12.

Of course, the driver can tell from the part 4 of the strip B the condition of the road ahead.

From the foregoing it will be seen that I have provided means whereby the driver or occupant of an automobile can ascertain the condition of the road ahead of him and when a dangerous place in the road is being approached a buzzer will sound and a sign indicating such condition will be illuminated and then the vehicle will be stopped by the application of the brakes and the closing of the gasoline line and the opening of the ignition circuit.

It is thought from the foregoing description that the advantages and novel features of the invention will be readily apparent.

It is to be understood that changes may be made in the construction and in the combination and arrangement of the several parts, provided that such changes fall within the scope of the appended claims.

While the device is shown in use on a motor vehicle, it is to be understood that it can be used with but slight change on railroad trains for automatically stopping the same at any desired place and for informing the passengers of the names of the towns and cities they are approaching and the device can be used with the aid of short-wave radios in controlling traffic in accordance with the stop and go signal system.

What is claimed is:—

1. In an automobile, a spirally grooved drum, a motor for driving the same, a brake applying rod, a dog carried thereby and engaging the groove, means for releasing the dog from the groove when the rod is being moved to brake applying position, means operated by the motor for returning the parts to the original position to release the brakes, means for closing the gasoline line and breaking the ignition circuit of the automobile when the rod moves to brake applying position, manually operated means for opening the line and closing the ignition circuit, a route strip actuated from a movable part of the automobile and means for controlling the circuit of the drum driving motor by said strip.

2. In an automobile, a spirally grooved drum, a motor for driving the same, a brake applying rod, a dog carried thereby and engaging the groove, means for releasing the dog from the groove when the rod is being moved to brake applying position, means operated by the motor for returning the parts to the original position to release the brakes, means for closing the gasoline line and breaking the ignition circuit of the automobile when the rod moves to brake applying position, manually operated means for opening the line and closing the ignition circuit, a route strip actuated from a movable part of the automobile and means for controlling the circuit of the drum driving motor by said strip, said means including a magnet, a switch closed when the magnet is energized, a second switch, means for opening the second switch when the brake applying rod is moved back to its original position, manually operated means for closing the second switch, said switches controlling a circuit to the motor and the magnet.

3. In a motor vehicle, a reciprocating member, means operated by movement of said member in one direction for stopping the vehicle, a pair of members, one reciprocating the reciprocating member in one direction and the other in the opposite direction, a motor for actuating said pair of members, automatic means for engaging the reciprocatory member with one of the pair of members and disengaging it from the second one of said pair of members at the ends of the strokes of the reciprocatory member, a route strip actuated from a movable part of the vehicle, and means for controlling the circuit of the motor by said strip.

BEAUFORD HAROLD DICKS.